Nov. 8, 1932.  J. P. ANDERSON  1,886,360
CAR CONSTRUCTION
Filed Sept. 19, 1930  2 Sheets-Sheet 1
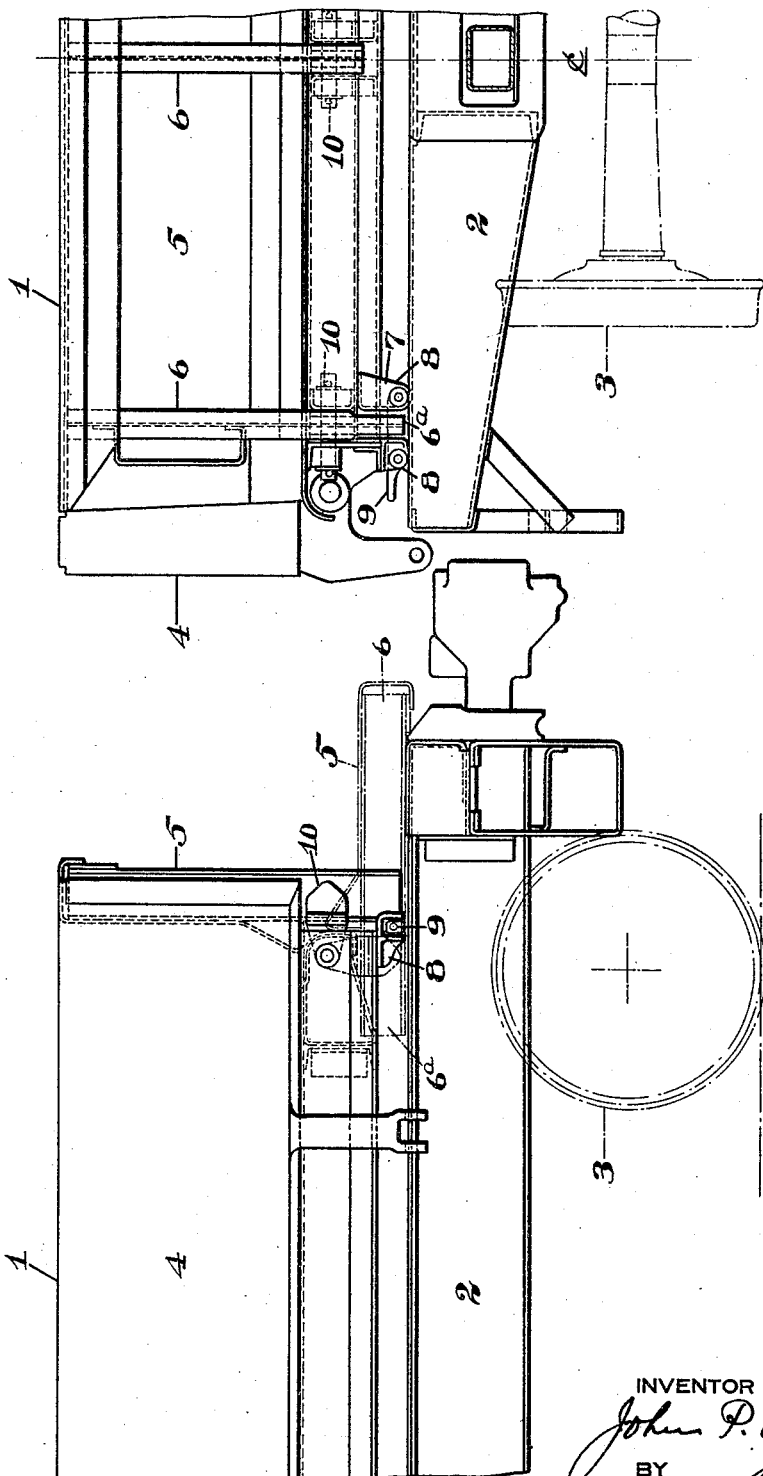
INVENTOR
John P. Anderson,
BY
ATTORNEY Nov. 8, 1932.  J. P. ANDERSON  1,886,360
CAR CONSTRUCTION
Filed Sept. 19, 1930   2 Sheets-Sheet 2
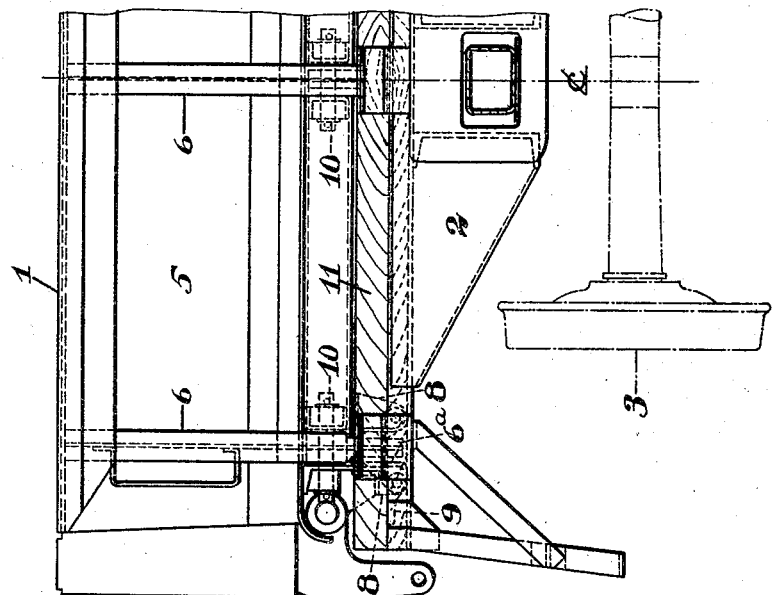
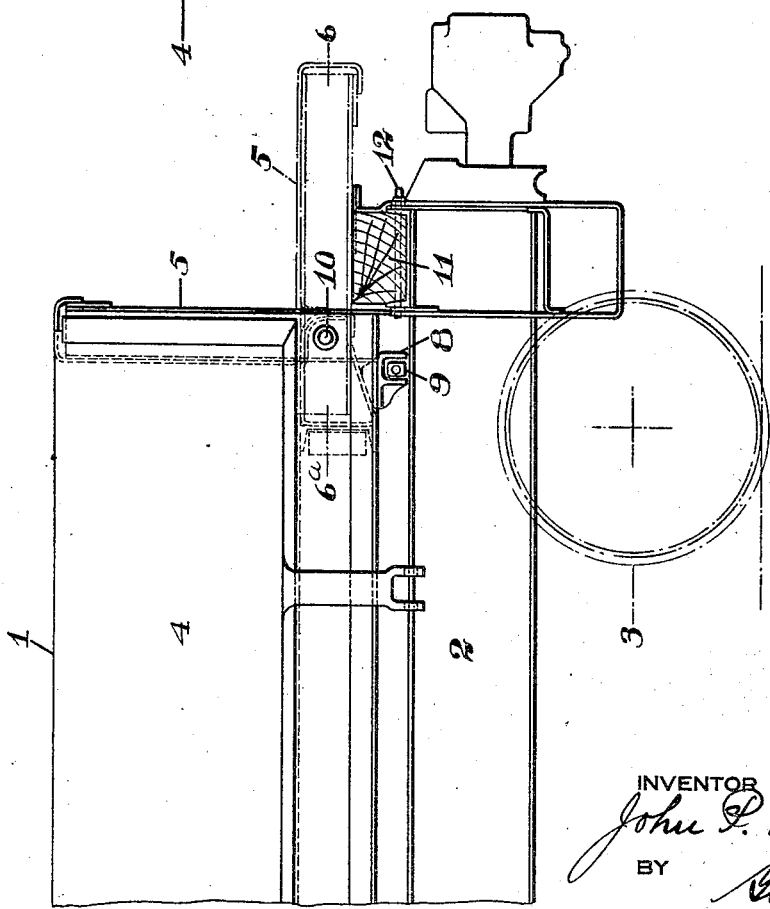
INVENTOR
John P. Anderson,
BY
ATTORNEY Patented Nov. 8, 1932

1,886,360

UNITED STATES PATENT OFFICE

JOHN P. ANDERSON, OF KOPPEL, PENNSYLVANIA, ASSIGNOR, BY MESNE ASSIGNMENTS, TO KOPPEL INDUSTRIAL CAR AND EQUIPMENT COMPANY, OF McKEES ROCKS, PENNSYLVANIA, A CORPORATION OF PENNSYLVANIA

CAR CONSTRUCTION

Application filed September 19, 1930. Serial No. 482,976.

My invention pertains to railway cars and particularly that type of railway car known as tilting dump cars and has for its object the provision of end doors for the body of the car, which doors may be opened outwardly and downwardly to form an extension of the body over the coupling mechanism between the car bodies.

Another object of my invention is to provide such an end door for a dump car tilting body which is independent in operating from the doors forming the sides of the body and which may be moved to raised or lowered position independent of the position of the side doors or the tilted or righted position of the car body.

Another object of my invention is to provide end doors for a dump car tilting body, which doors may be opened outwardly so that the end doors of adjacent car bodies bridge the space between the car bodies.

In construction projects on which dump cars are being used to convey materials from one point to another it is oftentimes advantageous to have a shovel or ditching machine move the length of the train of car bodies so as to facilitate loading of the material. Heretofore when desiring to move the shovel or ditching machine the length of the train of car bodies it has been necessary to provide, at the sides of the track upon which the train of cars is standing, a track upon which the shovel or ditching machine can move. In my invention it is proposed to have the end doors of the bodies open outwardly over the coupling mechanism between the car bodies so as to bridge the space between the car bodies and permit the shovel or ditching machine to use the floors of the bodies in moving from one end of the train to the other.

Referring now to the drawings, Fig. 1 shows in side elevation a portion of a dump car body embodying my invention; Fig. 2 shows in elevation the end of a dump car embodying my invention; Figs. 3 and 4 are similar views of a dump car showing a modification of my invention.

Referring now in detail to the drawings where like reference characters refer to like parts, reference character 1 indicates a dump car having the usual tilting body mounted on an underframe 2 which is supported on trucks of which the wheels 3 only are shown; reference character 4 indicates the doors forming the sides of the body to which may be attached any suitable mechanism for opening and closing the doors as the body is tilted. Although there has not been shown in the drawings any provision for the tilting of the car body or the operation of the doors simultaneous with the tilting of the body these mechanisms form no part of my invention and it is to be understood that any suitable mechanism may be used.

The ends of the bar body, instead of being made rigid as has heretofore been customary, are formed of doors 5 which are hinged adjacent the floor of the car body and open outwardly and downwardly so as to provide an extension outwardly from the car body over the adjacent end of the car underframe and the coupling mechanism. Spaced transversely of the door are stakes 6 which serve to brace the door, some of which have downwardly depending portions 6ª which engage with mechanisms beneath the floor of the body to maintain the door in closed position.

The mechanism mounted beneath the floor of the car body for maintaining the end doors in closed position may be of any suitable form and in the present embodiment of the invention comprises a member 7 mounted beneath the floor of the body and having spaced arms 8 between which the depending portion 6ª of the door stake moves as the door is opened and a member 9 is detachably fixed between these arms 8 so that when the member 9 is in position and the end door is raised into closed position the portions 6ª of the door stake butt against the member 9 and prevent any movement of the door 5 about its hinges 10.

As shown in dot and dash lines on Fig. 1 the door 5 when lowered projects outwardly over the end of the car and coupling mechanism but is below the level of the floor of the body and that in order to provide an uninterrupted passage between the floors of two adjacent car bodies it would be necessary to lay rails on the doors 5 upon which to move the shovel or ditching machine.

In the modification of my invention as shown in Figs. 3 and 4 of the drawings the door has been arranged so as to provide an extension of the floor of the body outwardly over the ends of the car and coupling mechanism and at the same level as the floor of the body. This raising of the level of the door, when opened, is accomplished by a suitable location of the hinges 10 and the provision of a stop member mounted adjacent the end of the car underframe and supporting the outer end of the car door. As shown in Figs. 3 and 4 this stop member is embodied in a wood member 11 extending transversely of the end of the car underframe for supporting the door throughout its width. As shown in dot and dash lines on Fig. 3 the door when opened outwardly extends over the end of the car and the coupling mechanism so that the door in conjunction with the door on the adjacent end of the adjacent car in the train when both are in lowered position bridge the space between the bodies.

As shown in Fig. 3 the member 11 is made detachable so that if at any time it is not desired to use the end doors of the car these doors may be fixed in closed position by the locking mechanism previously described and this member 11 may be removed, after withdrawing the locking members 12, so that the cars can be used as ordinary dump cars having fixed ends and only the side doors being movable.

Having thus described the invention what I claim as new and desire to secure by Letters Patent is:

1. In a dump car having a tiltable body, doors forming the end walls of said body, said doors being hinged adjacent the floor of said body, a downwardly depending member on said door, a depending member on said body, said depending door member detachably engaging with said depending body member to retain said door in closed position.

2. In a dump car having a tiltable body, doors forming the end walls of said body, said doors being hinged adjacent the floor of said body, a downwardly depending member on said body having a bifurcated lower portion, a downwardly depending member on said door, said door member moving between said bifurcated portion of the depending body member as the door is opened, and a member detachably engaged between said bifurcated portion of the depending body member and against which the depending door member butts when the door is in closed position.

3. In a dump car in combination, an underframe, a body tiltably mounted thereon, doors forming the side walls of said body, doors forming the end walls of said body, said doors being hinged adjacent the floor of the body, means for controlling the side doors with the tilting of the body, means for controlling the end doors independent of the side doors and means located on said underframe providing a support for the end doors when in opened position.

4. In a dump car in combination, an underframe, a body tiltably mounted on said underframe, doors forming the side walls of said body hinged adjacent the floor thereof and adapted to open outwardly and downwardly as the body is tilted, doors forming the end walls of said body and opening outwardly and downwardly, means controlling the movement of said side and end doors, said means being located beneath the floor of the body and providing independent selective movement of the side and end doors relative to each other and to the car body.

5. In a dump car in combination, an underframe, a body tiltably mounted on the underframe, doors forming the side walls of said body, doors forming the end walls of the body, said end walls forming abutments for the side walls when the doors are in closed position, means for controlling the movement of the end doors independent of the side doors, said means being located on the body and independent in operation of the side doors of the body and the underframe of the car.

6. In a dump car in combination, a body, side and end walls on the body hinged adjacent the floor, means on the body providing independent control of the side and end walls.

7. In a dump car in combination, a body, side and end walls for the body hinged adjacent the floor thereof and means on the body below the floor for selectively controlling the movements of the side and end walls independently of each other.

8. The combination in a railway car of an underframe, a load sustaining platform tiltably mounted thereon, side and end walls hinged at the edges of said platform to provide a load retaining receptacle, means beneath said platform providing selective control of said side and end walls and means adjacent the end of said platform providing a support for the end wall when lowered to form an outward extension of said platform.

9. In a dump car in combination, an underframe, a body, side and end walls on the body being formed as doors hinged adjacent the floor of the body, means for independent selective control of said doors, said means being located beneath the floor of said body and having independent connections to each door.

10. In a dump car in combination, an underframe, a body tiltably mounted on the underframe, side walls for said body adapted for movement controlled by the tilting of the body, an end wall on said body, means on said end wall and body providing for the selective positioning of the end walls as a continuation of the floor of the body outwardly of the normal position of said end wall, said means being located on the body and end wall independent of the sides of the body.

11. In a dump car in combination, an underframe, a body tiltably mounted on the underframe, side walls for said body adapted for movement controlled by the tilting of the body, an end wall on said body, means on said end wall and body providing for the selective positioning of the end walls as a continuation of the floor of the body outwardly of the normal position of said end wall, said means being positioned adjacent the floor of the body.

12. In a dump car in combination, an underframe, a tiltably mounted body, doors forming the side and end walls of the body, independent means for locking each door in closed position, said end door locking means being independently of said side doors.

13. In a dump car in combination, an underframe, a tiltably mounted body, doors forming the side and end walls of the body, independent means for locking each door in closed position, said end door locking means being independent of the underframe.

14. In a dump car in combination, an underframe, a tiltably mounted body, doors forming the side and end walls of the body, independent means for locking each door in closed position, said end door locking means being located below the floor of the body.

15. In a dump car in combination, an underframe, a body mounted on said underframe for lateral dumping movement, doors forming the side and end walls of said body, said end doors being independent in operation of the side doors, forming outward extensions of the floor of the body when in opened position and when opened, lying in a plane below the horizontal plane of the floor.

16. In a dump car in combination, an underframe, a body tiltably mounted on the underframe, doors forming the sides and end walls of the body, said doors being mounted on the body independently of each other, means on said body for selectively maintaining said end doors in raised or lowered position independently of the side doors and independently of said underframe and means on said underframe spaced outwardly of the normal position of said end walls providing a support for said end walls when in lowered position.

JOHN P. ANDERSON.